United States Patent
Lyu et al.

(10) Patent No.: US 10,764,004 B2
(45) Date of Patent: Sep. 1, 2020

(54) DATA TRANSMISSION METHOD AND APPARATUS

(71) Applicant: Huawei Technologies Co., Ltd., Shenzhen (CN)

(72) Inventors: Yongxia Lyu, Ottawa (CA); Ruixiang Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/402,869

(22) Filed: May 3, 2019

(65) Prior Publication Data

US 2019/0280827 A1 Sep. 12, 2019

Related U.S. Application Data

(63) Continuation of application No. PCT/CN2017/104626, filed on Sep. 29, 2017.

(30) Foreign Application Priority Data

Nov. 5, 2016 (CN) .......................... 2016 1 0982394

(51) Int. Cl.
*H04L 1/18* (2006.01)
*H04L 1/00* (2006.01)
(Continued)

(52) U.S. Cl.
CPC .......... *H04L 1/1887* (2013.01); *H04L 1/0002* (2013.01); *H04L 1/1812* (2013.01);
(Continued)

(58) Field of Classification Search
CPC ... H04L 1/0002; H04L 1/1887; H04L 5/0091; H04L 1/1893; H04L 5/0055; H04L 5/0044
See application file for complete search history.

(56) References Cited

U.S. PATENT DOCUMENTS

2014/0254528 A1 9/2014 Quan et al.
2015/0195816 A1 7/2015 Lee et al.
(Continued)

FOREIGN PATENT DOCUMENTS

| CN | 102571265 A | 7/2012 |
|---|---|---|
| CN | 105337684 A | 2/2016 |
| WO | 9907101 A1 | 2/1999 |

OTHER PUBLICATIONS

Intel Corporation, "On HARQ support for URLLC", 3GPP TSG RAN WG1 Meeting #86bis, R1-1609543, Lisbon, Portugal, Oct. 10-14, 2016, XP051149582, 5 pages.
(Continued)

*Primary Examiner* — Asad M Nawaz
*Assistant Examiner* — Syed Ali
(74) *Attorney, Agent, or Firm* — Slater Matsil, LLP

(57) ABSTRACT

A data transmission method and an apparatus are disclosed. The method includes: determining, by an access network device, a transmission mode of service data, where the transmission mode includes a one-time transmission mode and an automatic repeat transmission mode; sending, by the access network device, first indication information to a terminal device, where the first indication information indicates the determined transmission mode; and sending, by the access network device, the service data to the terminal device using the determined transmission mode.

16 Claims, 1 Drawing Sheet

---

Step S101: An access network device determines a transmission mode of service data, where the transmission mode includes a one-time transmission mode and an automatic repeat transmission mode Step S102: The access network device sends first indication information to a terminal device, where the first indication information is used to indicate the determined transmission mode Step S103: The access network device sends the service data to the terminal device by using the determined transmission mode

(51) Int. Cl.
*H04W 72/12* (2009.01)
*H04L 5/00* (2006.01)
*H04L 1/08* (2006.01)

(52) U.S. Cl.
CPC .......... *H04L 1/1825* (2013.01); *H04L 1/1864* (2013.01); *H04L 1/1893* (2013.01); *H04L 1/1896* (2013.01); *H04L 5/006* (2013.01); *H04L 5/0044* (2013.01); *H04L 5/0055* (2013.01); *H04L 5/0091* (2013.01); *H04W 72/1289* (2013.01); *H04L 1/08* (2013.01); *H04L 1/1819* (2013.01)

(56) References Cited

U.S. PATENT DOCUMENTS

| | | | |
|---|---|---|---|
| 2017/0135080 A1 | 5/2017 | Xia et al. | |
| 2017/0208588 A1* | 7/2017 | Park | H04L 27/2656 |
| 2017/0222754 A1* | 8/2017 | Noh | H04L 1/0061 |
| 2018/0235008 A1* | 8/2018 | Park | H04W 74/0808 |
| 2018/0242367 A1* | 8/2018 | Kim | H04L 5/001 |
| 2018/0323830 A1* | 11/2018 | Park | H04B 7/024 |
| 2019/0007175 A1* | 1/2019 | Kwak | H04L 1/1861 |
| 2019/0150187 A1* | 5/2019 | Park | H04L 5/001 370/330 |
| 2019/0261397 A1* | 8/2019 | Takeda | H04W 72/12 |
| 2019/0312669 A1* | 10/2019 | Kwak | H04L 1/0026 |

OTHER PUBLICATIONS

ZTE, et al., "Consideration on the support of URLLC in NR", 3GPP TSG-RAN WG2 Meeting #86, R2-168473, Reno, USA; Nov. 14-18, 2016, XP051192510, 6 pages.

LG Electronics,"Handling URLLC in new RAT," 3GPP TSG RAN WG1 Meeting #86 R1-166886,Gothenburg, Sweden Aug. 22-26, 2016, 5 pages.

* cited by examiner

DATA TRANSMISSION METHOD AND APPARATUS

CROSS-REFERENCE TO RELATED APPLICATIONS

This application is a continuation application of international application No. PCT/CN2017/104626, filed on Sep. 29, 2017, which claims priority to Chinese Patent Application No. 201610982394.4, filed on Nov. 5, 2016. The disclosures of the aforementioned applications are hereby incorporated by reference in their entireties.

TECHNICAL FIELD

The present disclosure relates to the communications field, and more specifically, to a data transmission method and an apparatus.

BACKGROUND

A 5G communications system is dedicated to supporting higher system performance and supports a plurality of service types, different deployment scenarios, and a wider frequency spectrum scope. The plurality of service types includes enhanced mobile broadband (eMBB), massive machine type communications (mMTC), ultra-reliable and low latency communications (URLLC), a Multimedia Broadcast Multicast Service (MBMS), and a positioning service. The different deployment scenarios include an indoor hotspot scenario, a dense urban scenario, a suburb scenario, an urban macro cell, a high-speed rail scenario, and the like.

A major feature of the 5G communications system relative to a 4G communications system is that support for an ultra-reliable and low latency communications (URLLC) service is added. There is a plurality of URLLC service types, and examples include industrial control, industrial production process automation, man-machine interaction, telemedicine, and the like. Primary indicator requirements of a URLLC service include latency and reliability.

A typical requirement of the URLLC service for a latency on a user plane is 0.5 ms for both uplink and downlink, and a typical requirement for reliability is to reach 99.999% reliability within 1 ms. It should be noted that the foregoing performance indicators are merely typical values. A specific URLLC service may have a different requirement for reliability. For example, extremely stringent industrial control requires an end-to-end latency of 0.25 ms or less and a transmission success probability of 99.9999999%.

A current basic scheduling policy of a URLLC service may be classified into two types. One is a one-time transmission mode in which error correction does not depend on feedback and data retransmission. This requires allocation of adequate time-frequency resources in first-time data transmission to ensure reliability of one-time transmission. A resource utilization rate of this scheduling policy is relatively low. The other scheduling policy is a feedback-based automatic repeat mode in which data reliability can be ensured by performing transmission a plurality of times in a range allowed by a latency. Resource utilization of this scheduling policy is obviously higher than that of the first policy, but a latency of this scheduling policy is greater than that of the first policy.

In different URLLC service scenarios, reliability and latency requirements are different. In existing wireless communications technologies, service data is generally transmitted using a fixed transmission mode, making it difficult to meet flexible reliability and latency requirements in the URLLC service scenarios.

SUMMARY

A data transmission method and an apparatus provided in embodiments of the present invention can meet flexible reliability and latency requirements.

According to a first aspect, a data transmission method is provided. The method includes determining, by an access network device, a transmission mode of service data, where the transmission mode includes a one-time transmission mode and an automatic repeat transmission mode. The method also includes sending, by the access network device, first indication information to a terminal device, where the first indication information indicates the determined transmission mode. The method also includes sending, by the access network device, the service data to the terminal device using the determined transmission mode.

According to a second aspect, a data transmission method is provided. The method includes receiving, by a terminal device, first indication information from an access network device, where the first indication information indicates a transmission mode, and the transmission mode includes a one-time transmission mode and an automatic repeat transmission mode. The method also includes receiving, by the terminal device, service data from the access network device using the transmission mode indicated by the first indication information.

According to a third aspect, an access network device is provided. The device includes a processor, configured to determine a transmission mode of service data, where the transmission mode includes a one-time transmission mode and an automatic repeat transmission mode. The device also includes a transceiver, configured to send first indication information to a terminal device and send the service data to the terminal device using the determined transmission mode, where the first indication information indicates the determined transmission mode.

According to a third aspect, a terminal device is provided. The device includes a transceiver, configured to receive first indication information from an access network device, where the first indication information indicates a transmission mode, and the transmission mode includes a one-time transmission mode and an automatic repeat transmission mode. The device also includes a processor, configured to control the transceiver to receive service data from the access network device using the transmission mode indicated by the first indication information.

In the embodiments of the present invention, because the first indication information indicates one of the automatic repeat transmission mode and the one-time transmission mode, the transmission mode can be flexibly adjusted according to latency and reliability requirements of a current service, thereby meeting different service requirements.

BRIEF DESCRIPTION OF THE DRAWINGS

To describe the technical solutions in the embodiments of the present invention, the following briefly introduces the accompanying drawings required for describing the embodiments of the present invention. Apparently, the accompanying drawings in the following description show merely some embodiments of the present invention, and a person of ordinary skill in the art may derive other drawings from these accompanying drawings without creative efforts.

DETAILED DESCRIPTION OF ILLUSTRATIVE EMBODIMENTS

Figure 1:
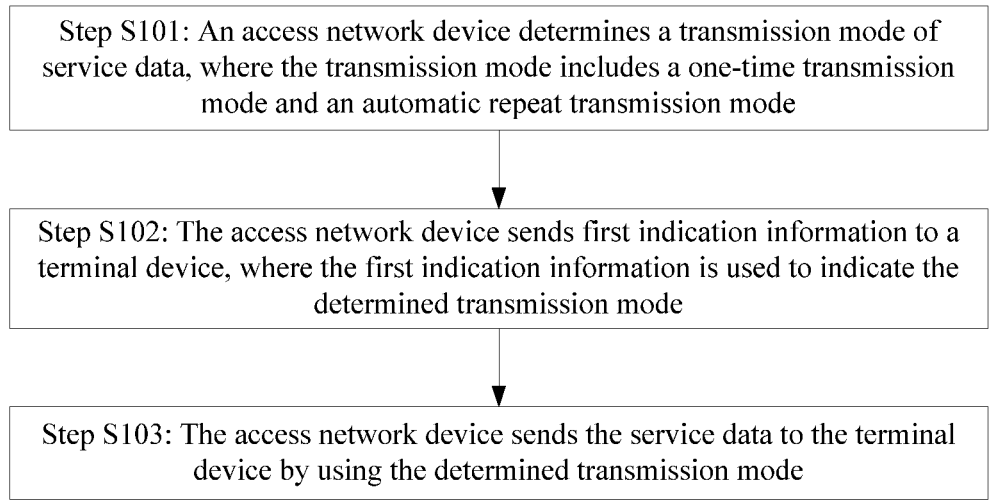
FIG. 1 is a schematic interaction diagram of a data transmission method according to an embodiment of the present invention.

The following describes the technical solutions in the embodiments of the present invention with reference to the accompanying drawings in the embodiments of the present invention.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in the figures, both a computing device and an application that runs on a computing device may be components. One or more components may reside in a process and/or a thread of execution, and the components may be located on one computer and/or distributed between two or more computers. In addition, these components may be executed from various computer-readable media that store various data structures. The components may communicate using a local and/or remote process and according to, for example, a signal having one or more data packets (for example, data from two components interacting with another component in a local system, a distributed system, and/or across a network such as the Internet interacting with other systems using the signal).

The solutions in the embodiments of the present invention may be applied to an existing cellular communications system, for example, systems such as a Global System for Mobile Communications (GSM), a Wideband Code Division Multiple Access (WCDMA) system, and a Long Term Evolution (LTE) system. Supported communications are mainly for voice and data communication. The solutions in the embodiments of the present invention may also be applied to a next generation communications system, for example, a 5G communications system.

The embodiments are described with reference to a terminal device in the embodiments of the present invention. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a wireless local area network (WLAN), a cellular phone, a cordless phone, a Session Initiation Protocol (SIP) phone, a wireless local loop (WLL) station, a personal digital assistant (PDA) device, a handheld device or a computing device having a wireless communication function, another processing device connected to a wireless modem, an in-vehicle device, a wearable device, a terminal device in a future 5G network, a terminal device in a future evolved PLMN network, or the like.

In addition, the embodiments are described with reference to an access network device in the embodiments of the present invention. The access network device may be a device that is configured to communicate with a mobile device, such as a network device. The access network device may be an access point (AP) in a WLAN or a base transceiver station (BTS) in GSM or Code Division Multiple Access (CDMA); or may be a NodeB (NB) in WCDMA; or may be an evolved NodeB (eNB or eNodeB) in Long Term Evolution (LTE), a relay station or an access point, a vehicular device, a wearable device, a network device in a future 5G network, a network device in a future evolved PLMN network, or the like.

In addition, aspects or features in the embodiments of the present invention may be implemented as a method, an apparatus or a product that uses standard programming and/or engineering technologies. The term "product" used in this application covers a computer program that can be accessed from any computer readable component, carrier, or medium. For example, the computer-readable medium may include but is not limited to: a magnetic storage device (for example, a hard disk, a floppy disk, or a magnetic tape), an optical disc (for example, a compact disc (CD), or a digital versatile disc (DVD)), a smart card and a flash memory device (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain and/or carry an instruction and/or data.

FIG. 1 is a schematic interaction diagram of a data transmission method according to an embodiment of the present invention. The following describes in detail the method 100 provided in the embodiment.

Step S101: An access network device determines a transmission mode of service data, where the transmission mode includes a one-time transmission mode and an automatic repeat transmission mode.

Specifically, the one-time transmission mode may be a transmission mode that does not support feedback or a plurality of hybrid automatic repeats. The automatic repeat transmission mode may be a transmission mode that allows a plurality of feedback-based hybrid automatic repeats.

For the access network device, the one-time transmission mode is a transmission mode in which acknowledgement information or negative acknowledgement information is not received, the automatic repeat transmission mode is a transmission mode in which acknowledgement information or negative acknowledgement information is received, where the acknowledgement information indicates that the service data is successfully received or is successfully decoded, and the negative acknowledgement information indicates that the service data fails to be received or fails to be decoded.

Accordingly, for a terminal device, the one-time transmission mode is a transmission mode in which acknowledgement information or negative acknowledgement information is not sent, the automatic repeat transmission mode is a transmission mode in which acknowledgement information or negative acknowledgement information is sent, the acknowledgement information indicates that the service data is successfully received or is successfully decoded, and the negative acknowledgement information indicates that the service data fails to be received or fails to be decoded.

In an implementation, the access network device determines a transmission mode of service data of an user with ultra-reliable and low latency based on one or more of various service load statuses in a network, a latency status of the user, and a channel quality status of the user.

For example, if there is a relatively small quantity of services having ultra-reliability and low-latency requirements in a current network, the one-time transmission mode may be used to mitigate impact on another service. On the contrary, if there is a relatively large quantity of services having ultra-reliability and low-latency requirements in a current network, a plurality of feedback-based hybrid automatic repeats may be used to increase a network capacity.

For example, from a perspective of a latency requirement of a scheduled terminal device, if the access network device determines that it is impossible to use the feedback-based automatic repeat transmission mode, for example, a latency allowed by a service of a user (namely, the terminal device) is less than a round-trip time (RTT) of a hybrid automatic repeat request (HARQ), it can be determined that the one-time transmission mode is used.

For another example, from a perspective of a channel quality status of the scheduled terminal device, if an excessive quantity of time-frequency resources are needed for the user (namely, the terminal device) to use the one-time transmission mode to meet a reliability requirement, that is, using the one-time transmission mode may severely affect scheduling of another user, it can be determined that the automatic repeat transmission mode is used.

Step S102: The access network device sends first indication information to a terminal device, where the first indication information indicates the determined transmission mode. Accordingly, the terminal device receives the first indication information from the access network device.

In an implementation, the first indication information may be carried in physical layer signaling or higher layer signaling. For example, the first indication information may be 1-bit information. A value of the 1-bit information indicates one of the one-time transmission mode and the automatic repeat transmission mode.

Step S103: The access network device sends the service data to the terminal device using the determined transmission mode. Accordingly, the terminal device receives the service data from the access network device using the transmission mode indicated by the first indication information.

The following separately describes the one-time transmission mode and the automatic repeat transmission mode in detail.

One-time transmission mode:

When the determined transmission mode is the one-time transmission mode, step S103 is described in detail as follows.

The access network device sends M coded data blocks to the terminal device, where M≥2. Optionally, the M coded data blocks are coded data blocks that can be separately decoded, and the M coded data blocks carry same service data. That the M coded data blocks are coded data blocks that can be separately decoded means that only each of the M coded data blocks can be separately decoded; or means that each of the M coded data blocks can be separately decoded, and further at least two of the M coded data blocks can be jointly decoded. Because the M coded data blocks carry the same service data, the same service data can be obtained by separately decoding each of the M coded data blocks or jointly decoding at least two coded data blocks of the M coded data blocks. Optionally, a value of M may be determined by the access network device based on factors such as channel quality of the terminal device or a quantity of available time-frequency resources.

Accordingly, when the indicated transmission mode is the one-time transmission mode, the terminal device receives the M coded data blocks from the access network device, where M≥2. The terminal device decodes at least one of the M coded data blocks. For example, the terminal device may separately decode each of the M coded data blocks, or the terminal device decodes one or more of the M coded data blocks a plurality of times. Preferably, the decoding a plurality of times includes: preferentially selecting a coded data block that includes a largest quantity of coded bits to perform one-time decoding, where it is ensured that coded data blocks used for different times of decoding are independent.

It can be learned from the above that in the one-time transmission mode, because the access network device sends, to the terminal device, a plurality of coded data blocks that carry same service data and can be separately decoded, there may be a relatively high probability that the terminal device performs decoding correctly. Therefore, in the one-time transmission mode, there is relatively high service data transmission reliability.

Automatic repeat transmission mode:

When the determined transmission mode is the automatic repeat transmission mode, step S103 is described in detail as follows.

The access network device sends at least one first coded data block to the terminal device. The terminal device decodes the at least one first coded data block. The terminal device sends acknowledgement information or negative acknowledgement information corresponding to the first coded data block to the access network device. The access network device receives the acknowledgement information or negative acknowledgement information corresponding to the at least one first coded data block from the terminal device. If the access network device receives the negative acknowledgement information indication, the access network device sends at least one second coded data block to the terminal device. The terminal device decodes the at least one second coded data block. Optionally, both the at least one first coded data block and the at least one second coded data block are coded data units that can be separately decoded, and the at least one first coded data block and the at least one second coded data block carry the same service data. Optionally, a quantity of the at least one first coded data block and a quantity of the at least one second coded data block may be determined by the access network device based on a factor such as channel quality of the terminal device or a quantity of available time-frequency resources.

Optionally, that the terminal device decodes the at least one first coded data block may be performed in the following manner. The terminal device separately decodes each of the at least one first coded data block, or the terminal device decodes one or more of the at least one first coded data block a plurality of times.

Similarly, that the terminal device decodes the at least one second coded data block may be performed in the following manner. The terminal device separately decodes each of the at least one second coded data block, or the terminal device decodes one or more of the at least one second coded data block a plurality of times.

Preferably, the decoding a plurality of times includes: preferentially selecting a coded data block that includes a largest quantity of coded bits to perform one-time decoding, where it is ensured that coded data blocks used for different times of decoding are independent.

Optionally, the M coded data blocks include the at least one first coded data block and the at least one second coded data block. To be specific, in the automatic repeat transmission mode, the at least one first coded data block may be used as an initially transmitted coded data block, the at least one second coded data block may be used as a retransmitted coded data block, and the at least one first coded data block and the at least one second coded data block carry the same service data. When the at least one first coded data block initially transmitted fails to be received or fails to be decoded, the access network device may send the at least one second coded data block as a retransmitted coded data block to the terminal device based on the negative acknowledgement information indication fed back by the terminal device. In contrast, in the one-time transmission mode, the access network device sends the M coded data blocks including the at least one first coded data block and the at least one second coded data block to the terminal device.

It can be learned from the above that in the automatic repeat transmission mode, because the access network device first sends the at least one first coded data block as initial transmitted coded data block to the terminal device and then determines whether to send the at least one second coded data block based on feedback information of the terminal device, a latency is relatively low.

In addition, in this embodiment of the present invention, because the first indication information indicates one of the automatic repeat transmission mode and the one-time transmission mode, the transmission mode can be flexibly adjusted according to latency and reliability requirements of a current service, thereby meeting different service requirements.

Optionally, the access network device sends second indication information to the terminal device, where when the first indication information indicates the one-time transmission mode, the second indication information indicates first transmission information of the M coded data blocks, and/or when the first indication information indicates the automatic repeat transmission mode, the second indication information indicates second transmission information of the acknowledgement information or the negative acknowledgement information.

Optionally, the first transmission information includes one or more of a value of M, a time-frequency resource location of at least one of the M coded data blocks, a data block length of at least one of the M coded data blocks, and information of a redundancy version of at least one of the M coded data blocks; and/or the second transmission information includes at least one of time-frequency resource information that is used to send the acknowledgement information or the negative acknowledgement information and sequence information that is used when the acknowledgement information or the negative acknowledgement information is sent.

Optionally, the second indication information is carried in physical layer signaling; or the second indication information and the first indication information are carried in same physical layer signaling.

Optionally, the value of M is one of a plurality of candidate values, and the plurality of candidate values are notified by the higher layer signaling or preconfigured; and/or the time-frequency resource location is one of a plurality of candidate locations, and the plurality of candidate locations are notified by the higher layer signaling or preconfigured; and/or the data block length is one of a plurality of candidate lengths, and the plurality of candidate lengths are notified by the higher layer signaling or preconfigured; and/or the redundancy version is one of a plurality of candidate redundancy versions, and the plurality of candidate redundancy versions are notified by the higher layer signaling or preconfigured; and/or the information of the redundancy version is indicated using the time-frequency resource location, where the information of the redundancy version is in a mapping relationship with a frequency-domain resource location and the mapping relationship is notified by the higher layer signaling or preconfigured.

Specifically, a plurality of predefined values may be configured for a quantity of coded data blocks by the higher layer signaling, and then one of the predefined values is dynamically indicated by the physical layer signaling; a plurality of time-frequency relative locations of the 1st coded data block may be configured for time-frequency resource location information by the higher layer signaling, and then one of the predefined values is dynamically indicated by the physical layer signaling; a plurality of data block lengths may be configured for data block length information by the higher layer signaling, and then one of the predefined values is dynamically indicated by the physical layer signaling; and information of a redundancy version may be predefined by a protocol, and then based on a location of each data block in frequency domain, a redundancy version of the data block is determined.

It can be learned that in the foregoing optional implementations, the second indication information has different meanings in different transmission modes and indicates different transmission information. To be specific, in different transmission modes, same second indication information is multiplexed to indicate different types of information, reducing control signaling overheads and reducing UE complexity.

Figure 2:
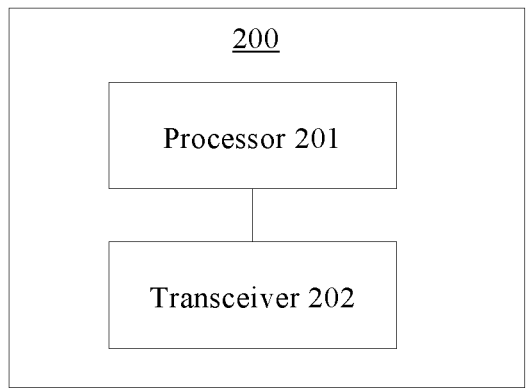
FIG. 2 is a schematic block diagram of an access network device according to an embodiment of the present invention.

FIG. 2 is a schematic block diagram of an example of an access network device 200 according to an embodiment of the present invention. The access network device 200 implements functions of the access network device described in the foregoing method 100, and each module or unit in the access network device 200 is configured to perform a corresponding action or processing process in the foregoing method 100. To avoid repeated description, details are omitted herein.

The access network device 200 includes: a processor 201, configured to determine a transmission mode of service data, where the transmission mode includes a one-time transmission mode and an automatic repeat transmission mode; and a transceiver 202, configured to send first indication information to a terminal device and send the service data to the terminal device using the determined transmission mode, where the first indication information indicates the determined transmission mode.

Optionally, the one-time transmission mode is a transmission mode in which acknowledgement information or negative acknowledgement information is not received, the automatic repeat transmission mode is a transmission mode in which acknowledgement information or negative acknowledgement information is received, the acknowledgement information indicates that the service data is successfully received or is successfully decoded, and the negative acknowledgement information indicates that the service data fails to be received or fails to be decoded.

Optionally, the transceiver is specifically configured to: send M coded data blocks to the terminal device when the determined transmission mode is the one-time transmission mode, where M≥2; and/or send at least one first coded data block to the terminal device when the determined transmission mode is the automatic repeat transmission mode; receive acknowledgement information or negative acknowledgement information corresponding to the at least one first coded data block from the terminal device; and if the access network device receives the negative acknowledgement information indication, send at least one second coded data block to the terminal device.

Optionally, the M coded data blocks are coded data blocks that can be separately decoded, and the M coded data blocks carry same service data; and/or both the at least one first coded data block and the at least one second coded data block are coded data units that can be separately decoded, and the at least one first coded data block and the at least one second coded data block carry the same service data.

Optionally, the M coded data blocks include the at least one first coded data block and the at least one second coded data block.

Optionally, the first indication information is carried in physical layer signaling or higher layer signaling.

Optionally, the transceiver is further configured to send second indication information to the terminal device, where when the first indication information indicates the one-time transmission mode, the second indication information indicates first transmission information of the M coded data blocks, and/or when the first indication information indicates the automatic repeat transmission mode, the second indication information indicates second transmission information of the acknowledgement information or the negative acknowledgement information.

Optionally, the first transmission information includes one or more of a value of M, a time-frequency resource location of at least one of the M coded data blocks, a data block length of at least one of the M coded data blocks, and information of a redundancy version of at least one of the M coded data blocks; and/or the second transmission information includes at least one of time-frequency resource information that is used to send the acknowledgement information or the negative acknowledgement information and sequence information that is used when the acknowledgement information or the negative acknowledgement information is sent.

Optionally, the second indication information is carried in physical layer signaling; or the second indication information and the first indication information are carried in same physical layer signaling.

Optionally, the value of M is one of a plurality of candidate values, and the plurality of candidate values are notified by the higher layer signaling or preconfigured; and/or the time-frequency resource location is one of a plurality of candidate locations, and the plurality of candidate locations are notified by the higher layer signaling or preconfigured; and/or the data block length is one of a plurality of candidate lengths, and the plurality of candidate lengths are notified by the higher layer signaling or preconfigured; and/or the redundancy version is one of a plurality of candidate redundancy versions, and the plurality of candidate redundancy versions are notified by the higher layer signaling or preconfigured; and/or the information of the redundancy version is indicated using the time-frequency resource location, where the information of the redundancy version is in a mapping relationship with a frequency-domain resource location and the mapping relationship is notified by the higher layer signaling or preconfigured.

Figure 3:
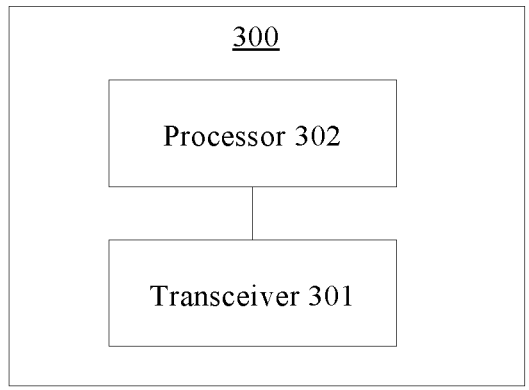
FIG. 3 is a schematic block diagram of a terminal device according to an embodiment of the present invention.

FIG. 3 is a schematic block diagram of an example of a terminal device 300 according to an embodiment of the present invention. The terminal device 300 implements functions of the terminal device described in the foregoing method 100, and each module or unit in the terminal device 300 is configured to perform a corresponding action or processing process in the foregoing method 100. To avoid repeated description, details are omitted herein.

The terminal device 300 includes: a transceiver 301, configured to receive first indication information from an access network device, where the first indication information indicates a transmission mode, and the transmission mode includes a one-time transmission mode and an automatic repeat transmission mode; and a processor 302, configured to control the transceiver to receive service data from the access network device using the transmission mode indicated by the first indication information.

Optionally, the one-time transmission mode is a transmission mode in which acknowledgement information or negative acknowledgement information is not sent, the automatic repeat transmission mode is a transmission mode in which acknowledgement information or negative acknowledgement information is sent, the acknowledgement information indicates that the service data is successfully received or is successfully decoded, and the negative acknowledgement information indicates that the service data fails to be received or fails to be decoded.

Optionally, that a processor is configured to control the transceiver to receive service data from the access network device using the transmission mode indicated by the first indication information includes: the processor is configured to: when the indicated transmission mode is the one-time transmission mode, control the transceiver to receive M coded data blocks from the access network device, where M≥2; and is configured to decode at least one of the M coded data blocks; and/or the processor is configured to: when the indicated transmission mode is the automatic repeat transmission mode, control the transceiver to receive at least one first coded data block from the access network device; decode the at least one first coded data block; control the transceiver to send acknowledgement information or negative acknowledgement information corresponding to the first coded data block to the access network device; if the first coded data block fails to be received or fails to be decoded, control the transceiver to receive at least one second coded data block from the access network device; and decode the at least one second coded data block.

Optionally, the M coded data blocks are coded data blocks that can be separately decoded, and the M coded data blocks carry same service data; and/or both the at least one first coded data block and the at least one second coded data block are coded data units that can be separately decoded, and the at least one first coded data block and the at least one second coded data block carry the same service data.

Optionally, the M coded data blocks include the at least one first coded data block and the at least one second coded data block.

Optionally, the first indication information is carried in physical layer signaling or higher layer signaling.

Optionally, the transceiver is further configured to receive second indication information from the access network device, where when the first indication information indicates the one-time transmission mode, the second indication information indicates first transmission information of the M coded data blocks, and/or when the first indication information indicates the automatic repeat transmission mode, the second indication information indicates second transmission information of the acknowledgement information or the negative acknowledgement information.

Optionally, the first transmission information includes one or more of a value of M, a time-frequency resource location of at least one of the M coded data blocks, a data block length of at least one of the M coded data blocks, and information of a redundancy version of at least one of the M coded data blocks; and/or the second transmission information includes at least one of time-frequency resource information that is used to send the acknowledgement information or the negative acknowledgement information and sequence information that is used when the acknowledgement information or the negative acknowledgement information is sent.

Optionally, the second indication information is carried in physical layer signaling; or the second indication information and the first indication information are carried in same physical layer signaling.

Optionally, the value of M is one of a plurality of candidate values, and the plurality of candidate values are notified by the higher layer signaling or preconfigured; and/or the time-frequency resource location is one of a plurality of candidate locations, and the plurality of candidate locations are notified by the higher layer signaling or preconfigured; and/or the data block length is one of a plurality of candidate lengths, and the plurality of candidate lengths are notified by the higher layer signaling or preconfigured; and/or the redundancy version is one of a plurality of candidate redundancy versions, and the plurality of candidate redundancy versions are notified by the higher layer signaling or preconfigured; and/or the information of the redundancy version is indicated using the time-frequency resource location, where the information of the redundancy version is in a mapping relationship with a frequency-domain resource location and the mapping relationship is notified by the higher layer signaling or preconfigured.

Optionally, the decoding at least one of the M coded data blocks includes: separately decoding each of the M coded data blocks; or decoding one or more of the M coded data blocks a plurality of times.

Optionally, the decoding the at least one first coded data block includes: separately decoding each of the at least one first coded data block; or decoding one or more of the at least one first coded data block a plurality of times; and the decoding the at least one second coded data block includes: separately decoding each of the at least one second coded data block; or decoding one or more of the at least one second coded data block a plurality of times.

Optionally, the decoding a plurality of times includes: preferentially selecting a coded data block that includes a largest quantity of coded bits to perform one-time decoding, where it is ensured that coded data blocks used for different times of decoding are independent.

Optionally, the processor is further configured to: after any one or more of the at least one first coded data block are successfully decoded, control the transceiver to send acknowledgement information corresponding to the first coded data block to the access network device.

It should be noted that the foregoing method embodiment of the present invention may be applied to a processor, or implemented by a processor. The processor may be an integrated circuit chip and has a signal processing capability. In an implementation process, steps in the foregoing method embodiment can be implemented using a hardware integrated logical circuit in the processor, or using instructions in a form of software. The processor may be a general purpose processor, a digital signal processor (DSP), an application-specific integrated circuit (ASIC), a field programmable gate array (FPGA) or another programmable logical device, a discrete gate or transistor logic device, or a discrete hardware component. It may implement or perform the methods, the steps, and logical block diagrams that are disclosed in the embodiments of the present invention.

The general purpose processor may be a microprocessor, or the processor may be any conventional processor or the like. Steps of the methods disclosed with reference to the embodiments of the present invention may be directly executed and accomplished using a hardware decoding processor, or may be executed and accomplished using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in a memory, and the processor reads information in the memory and completes the steps in the foregoing methods in combination with hardware of the processor.

It may be understood that the memory in the embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the current system, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   determining, by an access network device, a first transmission mode of service data, wherein the first transmission mode comprises a one-time transmission mode or an automatic repeat transmission mode;
   sending, by the access network device, first indication information to a terminal device, wherein the first indication information indicates the determined first transmission mode;
   sending, by the access network device, second indication information to the terminal device, wherein when the first indication information indicates the one-time transmission mode, the second indication information indicates first transmission information of M coded data blocks, wherein M≥2, and wherein when the first indication information indicates the automatic repeat transmission mode, the second indication information indicates second transmission information of acknowledgement information or negative acknowledgement information; and
   sending, by the access network device, the service data to the terminal device using the determined first transmission mode, wherein sending, by the access network device, the service data to the terminal device using the determined first transmission mode comprises:
   when the determined first transmission mode is the one-time transmission mode, sending, by the access network device, the M coded data blocks to the terminal device; or
   when the determined first transmission mode is the automatic repeat transmission mode, performing the following:
   sending, by the access network device, at least one first coded data block to the terminal device;
   receiving, by the access network device, acknowledgement information or negative acknowledgement information corresponding to the at least one first coded data block from the terminal device; and
   when the access network device receives the negative acknowledgement information, sending, by the access network device, at least one second coded data block to the terminal device.

2. The method according to claim 1, wherein the one-time transmission mode is a transmission mode in which acknowledgement information or negative acknowledgement information is not received in response to sending the service data, the automatic repeat transmission mode is a transmission mode in which acknowledgement information or negative acknowledgement information is received in response to sending the service data, the acknowledgement information indicates that the service data is successfully received or is successfully decoded, and the negative acknowledgement information indicates that the service data fails to be received or fails to be decoded.

3. The method according to claim 1, wherein:
   the first transmission information comprises a value of M, a time-frequency resource location of at least one of the M coded data blocks, a data block length of at least one of the M coded data blocks, or information of a redundancy version of at least one of the M coded data blocks; or
   the second transmission information comprises time-frequency resource information of a time-frequency resource that is used to send the acknowledgement information or the negative acknowledgement information, or sequence information that is used when the acknowledgement information or the negative acknowledgement information is sent.

4. The method according to claim 3, wherein:
   the second indication information is carried in physical layer signaling; or
   the second indication information and the first indication information are carried in a same physical layer signaling.

5. The method according to claim 4, wherein:
   the value of M is one of a plurality of candidate values, and the plurality of candidate values are notified to the terminal device by the higher layer signaling or pre-configured; or the time-frequency resource location of the at least one of the M coded data blocks is one of a plurality of candidate locations, and the plurality of candidate locations are notified to the terminal device by the higher layer signaling or preconfigured; or the data block length of the at least one of the M coded data blocks is one of a plurality of candidate lengths, and the plurality of candidate lengths are notified to the terminal device by the higher layer signaling or preconfigured; or the redundancy version of the at least one of the M coded data blocks is one of a plurality of candidate redundancy versions, and the plurality of candidate redundancy versions are notified to the terminal device by the higher layer signaling or preconfigured; or the information of the redundancy version is indicated using the time-frequency resource location of the at least one of the M coded data blocks, wherein the information of the redundancy version is in a mapping relationship with a frequency-domain resource location, and the mapping relationship is notified to the terminal device by the higher layer signaling or preconfigured.

6. The method according to claim 1, wherein the first indication information is carried in physical layer signaling or higher layer signaling.

7. A method, comprising:
receiving, by a terminal device, first indication information from an access network device, wherein the first indication information indicates a first transmission mode, and the first transmission mode comprises a one-time transmission mode or an automatic repeat transmission mode;
receiving, by the terminal device, second indication information from the access network device, wherein when the first indication information indicates the one-time transmission mode, the second indication information indicates first transmission information of M coded data blocks, wherein M≥2, and wherein when the first indication information indicates the automatic repeat transmission mode, the second indication information indicates second transmission information of acknowledgement information or negative acknowledgement information; and
receiving, by the terminal device, service data from the access network device using the first transmission mode indicated by the first indication information, wherein receiving, by the terminal device, the service data from the access network device using the first transmission mode indicated by the first indication information comprises:
  when the indicated first transmission mode is the one-time transmission mode, performing the following:
    receiving, by the terminal device, the M coded data blocks from the access network device, and
    decoding, by the terminal device, at least one of the M coded data blocks; or
  when the indicated transmission mode is the automatic repeat transmission mode, performing the following:
    attempting to receive, by the terminal device, at least one first coded data block from the access network device;
    when the at least one first coded data is successfully received, attempting to decode, by the terminal device, the at least one first coded data block;
    sending, by the terminal device, acknowledgement information or negative acknowledgement information corresponding to the at least one first coded data block to the access network device; and
    when the at least one first coded data block fails to be received or fails to be decoded, receiving, by the terminal device, at least one second coded data block from the access network device, and decoding, by the terminal device, the at least one second coded data block.

8. The method according to claim 7, wherein the one-time transmission mode is a transmission mode in which acknowledgement information or negative acknowledgement information is not sent in response to receiving the service data, the automatic repeat transmission mode is a transmission mode in which acknowledgement information or negative acknowledgement information is sent in response to receiving the service data, the acknowledgement information indicates that the service data is successfully received or is successfully decoded, and the negative acknowledgement information indicates that the service data fails to be received or fails to be decoded.

9. The method according to claim 8, further comprising:
separately decoding, by the terminal device, each first coded data block of the at least one first coded data block; or
decoding, by the terminal device, one or more first coded data block of the at least one first coded data block a plurality of times; and
wherein decoding, by the terminal device, the at least one second coded data block comprises:
separately decoding, by the terminal device, each second coded data block of the at least one second coded data block; or
decoding, by the terminal device, one or more second coded data block of the at least one second coded data block a plurality of times.

10. The method according to claim 7, wherein:
the M coded data blocks are coded data blocks that can be separately decoded, and the M coded data blocks carry same service data; or
both the at least one first coded data block and the at least one second coded data block are coded data units that can be separately decoded, and the at least one first coded data block and the at least one second coded data block each carry the same service data.

11. The method according to claim 10, wherein the M coded data blocks comprise the at least one first coded data block and the at least one second coded data block.

12. The method according to claim 7, wherein:
the first transmission information comprises a value of M, a time-frequency resource location of at least one of the M coded data blocks, a data block length of at least one of the M coded data blocks, and information of a redundancy version of at least one of the M coded data blocks; or
the second transmission information comprises time-frequency resource information of a time-frequency resource that is used to send the acknowledgement information or the negative acknowledgement information, or sequence information that is used when the acknowledgement information or the negative acknowledgement information is sent.

13. The method according to claim 12, wherein:
the value of M is one of a plurality of candidate values, and the plurality of candidate values are notified to the terminal device by the higher layer signaling or preconfigured; or the time-frequency resource location of the at least one of the M coded data blocks is one of a plurality of candidate locations, and the plurality of candidate locations are notified to the terminal device by the higher layer signaling or preconfigured; or the data block length of the at least one of the M coded data blocks is one of a plurality of candidate lengths, and the plurality of candidate lengths are notified to the terminal device by the higher layer signaling or preconfigured; or the redundancy version of the at least one of the M coded data blocks is one of a plurality of candidate redundancy versions, and the plurality of candidate redundancy versions are notified to the terminal device by the higher layer signaling or preconfigured; or the information of the redundancy version is indicated using the time-frequency resource location of the at least one of the M coded data blocks, wherein the information of the redundancy version is in a mapping relationship with a frequency-domain resource location, and the mapping relationship is notified to the terminal device by the higher layer signaling or preconfigured.

14. The method according to claim 7, wherein decoding, by the terminal device, the at least one of the M coded data blocks comprises:

separately decoding, by the terminal device, each of the M coded data blocks; or decoding, by the terminal device, one or more of the M coded data blocks a plurality of times.

15. A terminal device, comprising:

a transceiver, configured to:

receive first indication information from an access network device, wherein the first indication information indicates a first transmission mode, and the transmission mode comprises a one-time transmission mode or an automatic repeat transmission mode;

receive second indication information from the access network device, wherein when the first indication information indicates the one-time transmission mode, the second indication information indicates first transmission information of M coded data blocks, wherein M≥2, and wherein when the first indication information indicates the automatic repeat transmission mode, the second indication information indicates second transmission information of acknowledgement information or negative acknowledgement information; and at least one processor, configured to control the transceiver to receive service data from the access network device using the first transmission mode indicated by the first indication information, wherein receiving the service data from the access network device using the first transmission mode indicated by the first indication information comprises:

when the indicated first transmission mode is the one-time transmission mode, performing the following:

receiving the M coded data blocks from the access network device, and decoding at least one of the M coded data blocks; or when the indicated transmission mode is the automatic repeat transmission mode, performing the following:

attempting to receive at least one first coded data block from the access network device;

when the at least one first coded data is successfully received, attempting to decode the at least one first coded data block;

sending acknowledgement information or negative acknowledgement information corresponding to the at least one first coded data block to the access network device; and when the at least one first coded data block fails to be received or fails to be decoded, receiving at least one second coded data block from the access network device, and decoding the at least one second coded data block.

16. The terminal device according to claim 15, wherein the one-time transmission mode is a transmission mode in which acknowledgement information or negative acknowledgement information is not sent in response to receiving the service data, and the automatic repeat transmission mode is a transmission mode in which acknowledgement information or negative acknowledgement information is sent in response to receiving the service data, the acknowledgement information indicates that the service data is successfully received or is successfully decoded, and the negative acknowledgement information indicates that the service data fails to be received or fails to be decoded.

\* \* \* \* \*